United States Patent [19]

White

[11] Patent Number: 5,133,082

[45] Date of Patent: Jul. 21, 1992

[54] SELECTIVE MONITORING

[75] Inventor: Richard A. M. White, Arlington Heights, Ill.

[73] Assignee: Motorola, Inc., Schaumburg, Ill.

[21] Appl. No.: 673,609

[22] Filed: Mar. 22, 1991

[51] Int. Cl.[5] .............................................. H04B 7/00
[52] U.S. Cl. ................................. 455/35.1; 455/38.1; 455/67.1; 340/825.52
[58] Field of Search ...................... 455/35, 38, 67, 186, 455/226, 212, 218, 185, 186; 340/825.06, 825.07, 825.44, 825.5, 825.52; 379/63

[56] References Cited

U.S. PATENT DOCUMENTS

| | | | |
|---|---|---|---|
| 4,646,358 | 2/1987 | Shanley | 455/38 |
| 4,701,944 | 10/1987 | Howard et al. | |
| 4,716,407 | 12/1987 | Borras et al. | |
| 4,796,291 | 1/1989 | Makino | 455/38 |
| 4,979,231 | 12/1990 | Johnson et al. | |

*Primary Examiner*—Curtis Kuntz
*Attorney, Agent, or Firm*—Juliana Agon

[57] ABSTRACT

In a conventional non-trunked communication system (10) having a plurality of radios (13) being able to transmit and receive communication containing an ID number on a channel, a method is provided for any one of these radios (13) to select (36) the monitoring of transmissions of another radio communicating on the channel. In a receiving radio, the ID number corresponding to another radio is selectively entered (36) in a memory list of desirable ID's (35) to be monitored (35) by the receiving radio (13). When transmission containing an ID number (42) of a transmitting radio is received from the transmitting radio, the ID number of the transmitting radio is compared (48) to the memory list to find a match. A squelching means (25) is unmuted (31) only if a match is found and other unsquelching conditions are satisfied (56).

6 Claims, 2 Drawing Sheets

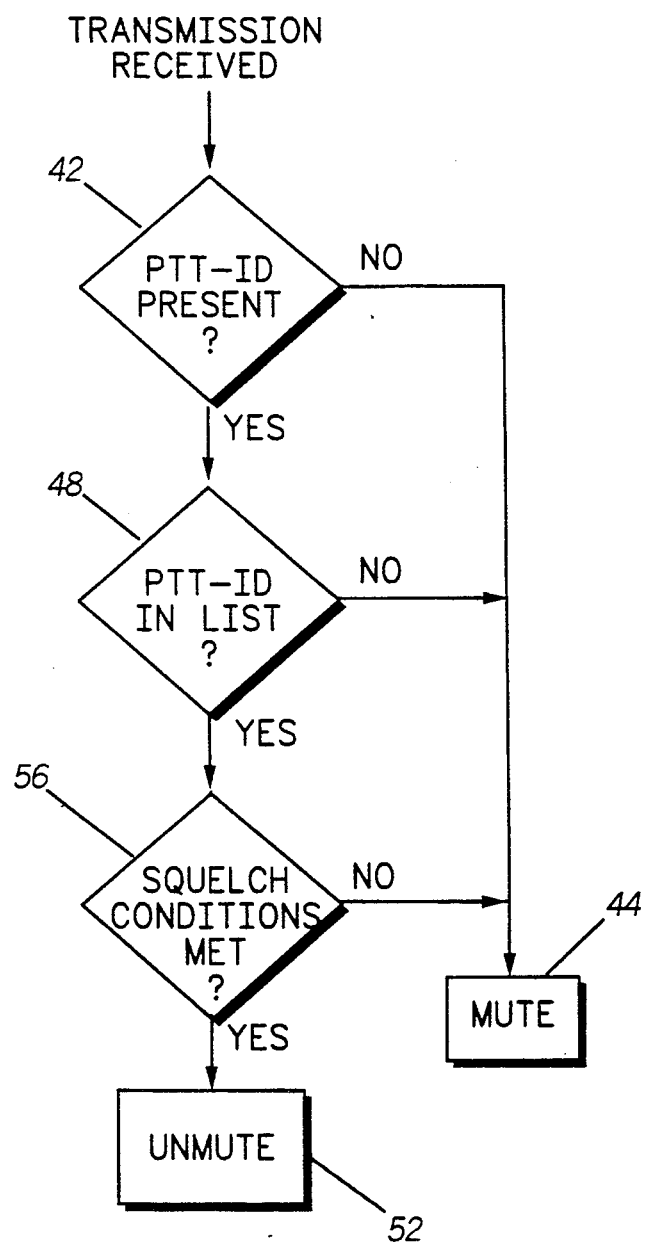

SELECTIVE MONITORING

TECHNICAL FIELD

This invention relates generally to radio communications systems of multiple users on a single channel and more particularly to the monitoring of such a channel for "desired" activity without having to be bothered by channel activity that the operator is not interested in.

Background

In a conventional two-way radio communication system, each operator or subscribed has the ability to monitor the activity of the channel that the radio or communication device is currently operating on. While the channel is being monitored, every transmission that satisfies the radio's unsquelch condition will be heard over the radio's speaker. To alleviate some of the traffic problems associated with multiple users on a single channel, selective calling is known and used in both and communication system to inhibit radios that are not currently engaged in communication. In one type of selective calling for conventional systems, voice transmission by and the unsquelching of a particular radio is permitted only after reception of that particular radio's identification (ID) code (in that particular radio).

Trunked communication system utilize a type of selective receiving based on an ID. However, because of the nature of trunking, a type of selective calling is first required. Typically, trunking subscriber units are assigned to various groups, called fleets which can be further subdivided into subfleets or subgroups. Each subscriber radio unit has a unique address stored in the internal memory, which consists of the unique unit's fleet, subfleet, and individual IDs or group, sub-group, and individual IDs.

Under this grouping for trunked communication systems, a subscriber unit requests a user channel assignment by transmitting a request to a system controller on an inbound control channel. The controller responds by transmitting a code containing a user channel assignment on an outbound control channel. In addition to the user channel assignment, the code also specifies which group of subscriber units (group or sub-group) should move to the newly assigned user channel. All subscribers monitoring the control channel and within the subscriber group or sub-group then switch over to the newly assigned user channel. Hence, a channel grant from the central controller, will cause any idle subscribers having a corresponding group or subgroup ID to move to an assigned channel as listening units. Similarly, a private subscriber calls for a subscriber to communicate privately with another subscriber, could also be accomplished by entering a private or individual ID number by the private call initiating trunked subscriber. This trunk method is, in effect, a type of selective calling.

With this type of preexisting selective calling, a trunking scan can occur which, by definition, is based only on the identification (ID) code, since the voice channel to be used will already be known. Since the subscriber's address is transmitted along with the channel request, the system controller then transmits a code which not only contains the channel assignment, but also the address of the originating unit. Other subscribers receiving this code during a trunking scan may then compare the received address to the entries and the priority message tables stored in their memories. These entries are the addresses of other subscriber units that have been listed as having priority over non-priority messages. If a subscriber unit is receiving a non-priority message, but it finds a match between the received address in one of the entries in the priority message table, it immediately switches to the priority channel specified in the received code. Alternatively, if the comparison with the priority table indicated that the priority calls is of a lower or equal priority level than the current message, or that the ID code of the priority called is one which the subscriber should not respond to, the subscriber unit will continue to process the current message.

However, in a conventional non-trunked communication system, remote units are not classified in any particular arrangement to obtain a similar degree of flexibility preexisting in trunked systems to partition voice conversations between different groups. Everybody communicating together is on the same channel, but other people may also be on the same channel, whereas, in a trunking system, a particular channel is assigned to a specified group or isolated group to control traffic.

Hence, limiting traffic under the control of the initiating end is known but a similar type of control is also desired on the receiving end.

SUMMARY OF THE INVENTION

Accordingly, it is an advantage of the present invention to provide a selective monitoring method to allow radio operators to monitor a given channel for "desired" activity without having to be bothered by channel activities that the operator is not interested in.

Briefly, according to the invention, in a communication system, having a plurality of radios able to transmit and receive communication containing an ID number on a channel, a method is provided for any one of these radios to select the monitoring of transmissions of another radio communicating on the channel. In a receiving radio, the ID number corresponding to another radio is selectively entered in a memory list of desirable IDs to be monitored by the receiving radio. When a transmission containing an ID number of a transmitting radio is received from the transmitting radio, the ID number of the transmitting radio is compared to the memory list to find a match. A squelching means is unmuted only if a match is found and other unsquelching conditions are satisfied.

BRIEF DESCRIPTION OF THE DRAWINGS

FIG. 3 is a flow diagram describing the steps required to selectively monitor a channel.

DETAILED DESCRIPTION OF THE PREFERRED EMBODIMENT

Figure 1:
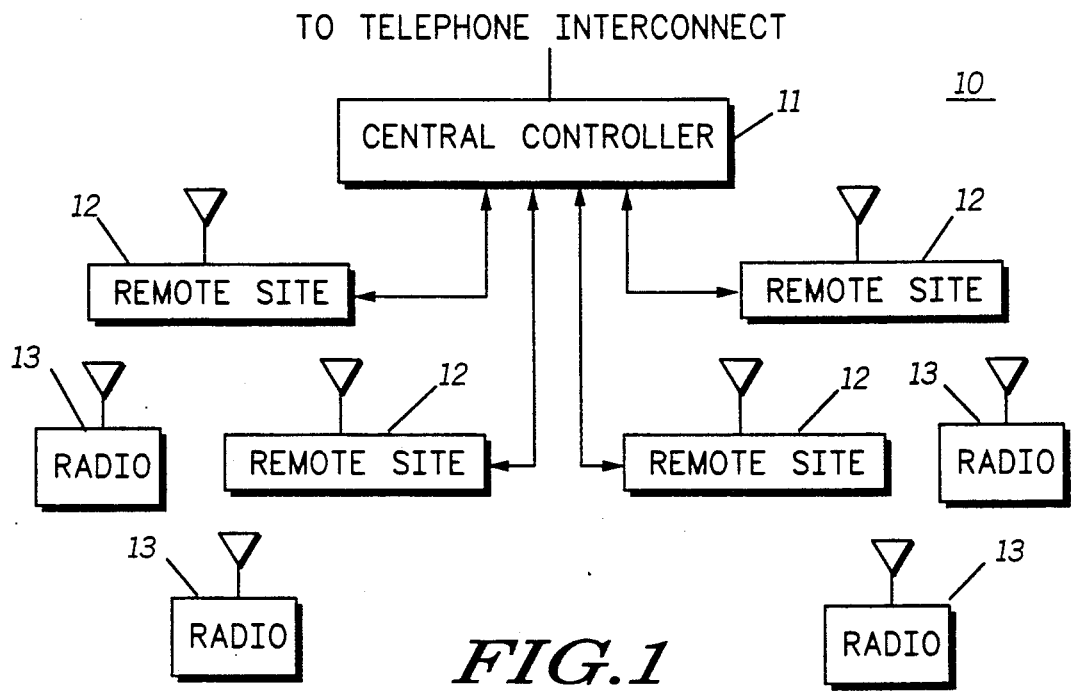
FIG. 1 an exemplary block diagram of a communication system suitable for using the present invention.

Referring to FIG. 1, it will be understood that the radio communication system 10, includes a central controller 11, which is connected to a plurality of remote site radios or repeaters 12. The remote site radios are repeaters 12 which provide radio communication links between a plurality of radios 13 and the central controller 11 in a two-way radio communicating system, which can also provide telephone interconnect. In such a system, calls originating from the central controller 11 can be simulcasted to the radios 13 at each remote site or repeater 12. When a called radio 13 responds, the communication is directed through the remote site or repeater 12, having the best quality received signal from the called radio 13.

Figure 2:
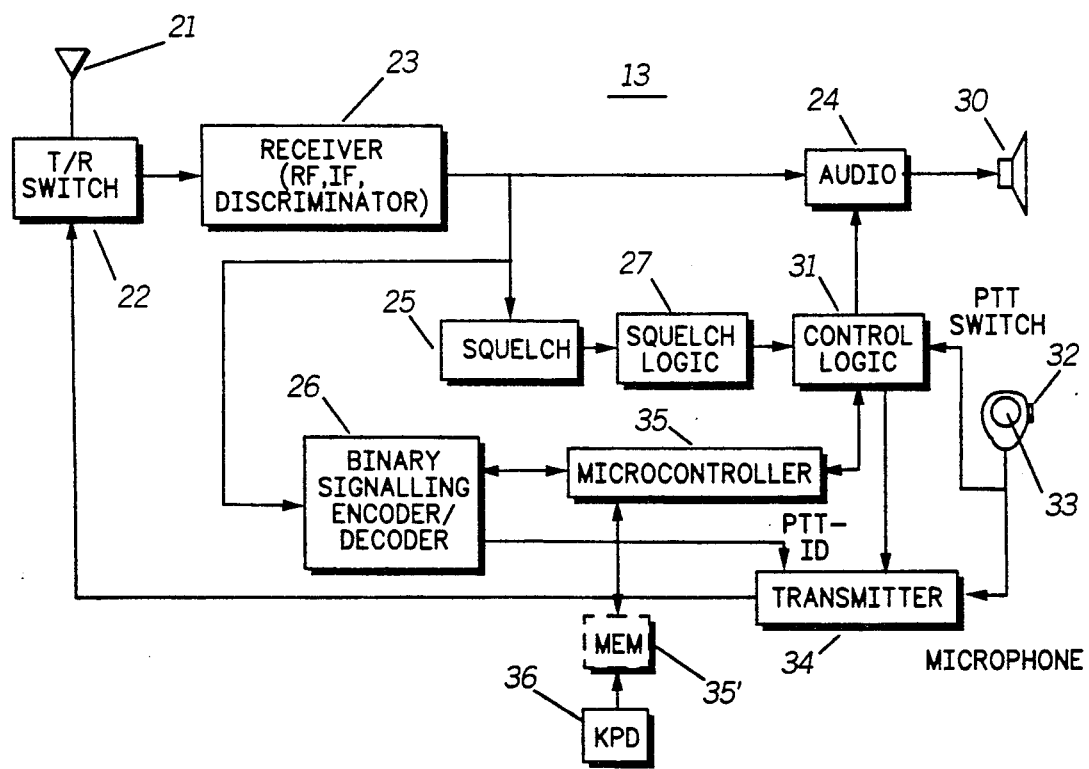
FIG. 2 is a block diagram of a radio with selective monitoring in accordance with the present invention.

Referring to FIG. 2, an individual radio or subscriber 13 is illustrated. An antenna 21 is connected by a transmitter/receiver (T/R) antenna switch 22 to either a receiver section 23 or a transmitter section 34 of the radio 13. The output of the receiver 23 is supplied to an audio circuit 24, to a squelch circuit 25, and to a selective receiving detector, comprising a binary signaling encoder/decoder, 26. The audio circuit 24 operates under the control of a squelch logic circuit 27, provides output signals to a speaker 30. The control logic 31 is in turn, controlled by a squelch logic 27. The selective receiving detector (or binary signaling detector/decoder) 26 which can comprise any conventional tone or digital detector circuit and constituting address detecting means, provides a squelch control signal to the control logic 31 via a microcontroller 35 for signaling to the audio circuit 24 when the ID (identification) number of the initiating radio has been received by the receiving radio and matched inside the receiving radio's memory (included in the microcontroller 35). Alternatively, a memory 35' may optionally be shown external to the microcontroller 35. The squelch circuit 5 is a conventional carrier or noise squelch circuit and provides an output that is applied to the control logic 31 via the squelch logic 27.

The control logic 31, comprising receiving inhibit means, includes an input which is applied from the squelch logic 27 and an output that is applied to the audio circuit 24. Inputs from the selective receiving detector 26 (via the microcontroller 35) and from a push-to-talk switch 32 are also applied to the control logic 31. The control logic 31 has a PTT output which is used for keying a transmitter 34 and switching the T/R switch 22. The T/R switch 22 connects the antenna to the transmitter 23 whenever the transmitter 34 is activated. A microphone 33 is sued for applying audio to the transmitter 34 for transmission. As in a conventional two-way radio system with PTT-ID capability, the ID of the initiating radio is automatically transmitted by the binary signaling encoder/decoder 26 via the transmitter 34, coupled to the antenna 21 by the T/R switch 22 when the push-to-talk switch 32 is pressed before voice is applied to the microphone 33. The encoding of PTT-ID's via the binary signaling encoder/decoder 26 and the decoding of the received PTT-ID's within the selective receiving detector 26 may all be implemented in a microprocessor which may include the microcontroller 35.

The microcontroller 35 can also provide an interface to the radio operator to allow the operator to turn the selective monitoring mode of operation on and off as well as edit or reprogram the list of valid PTT-IDs. The microcontroller 345 will contain, in its memory, a list of valid PTT-IDs that can be modified by the operator, such as via a keypad 36 as to which IDs to include. The selective monitoring mode of operation can be turned on and off selectively by the operator and will be automatically turned off when the radio microphone 33 is taken off hook in preparation for a transmission, in order to comply with FCC regulations for channel monitoring of all users prior to transmitting.

In operation, the selective receiving detector 26 detects the identification (ID) of the received address. The microcontroller 35 compares the received PTT-IDs to the PTT-IDs stored in the list of valid PTT-IDs that were selected by the operator as desired activity of certain individuals. If no match is found by the microcontroller 35, the audio circuit 24 is instructed to remain muted by the control logic 31. Otherwise, the audio circuit 24 is allowed to unmute, subject to the radio's conventional unsquelch conditions (25) being satisfied as determined by the squelch logic 27. Only then (match found and other squelch conditions met) will the control logic 31 permit the squelch logic (27) output signal to be switched to a noise unsquelch mode thereby permitting any transmitted signal on the channel to be heard on the speaker 30 via the audio circuit 24.

Referring to FIG. 3, a flow chart showing the steps of the operation in accordance with the invention is shown. In a radio system where voice transmissions are preceded with a PTT-ID, the "yes" branch from the "PTT-ID being present in the received transmission?" decision block will be taken (and determined in the microcontroller 35.) Otherwise the receiving radio will remain muted (44) after taking the "no" branch from the same decision block 42. Hence, the receiving radio will not unmute to transmission that are preceded with a valid PTT-IDs. Since a list of valid PTT-ID's which are programmable and selectable by the operator or user are already stored in a memory list of the receiving radio when the transmission is received, the receiving radio would unmute according to this memory list and the rest of the decision tree of the flow chart. If the PTT-ID received does not match the ones already stored in the current list (as determined by the microcontroller 35) in decision block 48, the receiving radio will take the "no" branch and mute the radio in step 44. On the other hand, the radio will unmute in step 52 if the PTT-ID matches. If the group of radios are set up more like a trunking configuration, where there are additional group or fleet IDs sub-group or subfleet IDs; the decision block 48 may also determined whether to unmute based on whether the received group ID or sub-group matches, an ID in the list of valid IDs. The receiving radio will still remain muted (44) unless other squelch conditions are satisfied as determined by the squelch logic 27, in decision block 56, which will then unmute the receiving radio 52.

In summary, in a two-way radio communication system the present invention utilizes the PTT-ID function which is already incorporated in conventional remote radios, but has not been utilized in the manner. To enable the operator or user of the receiving radio to monitor transmissions made can given channel by certain individuals, a selective monitoring mode of operation can be employed in which the receiving radio will only unmute to the transmission of radios that satisfy the receiving radio's unsquelched conditions (25) and are preceded by a valid PTT-ID corresponding to the monitored radio.

What is claimed is:

1. In a conventional non-trunked two-way radio communication system including a receiving radio for selectively monitoring transmissions of a transmitting radio, the receiving radio comprising:
    means for entering selectively an ID number corresponding to said transmitting radio to be monitored;

memory means for storing said ID number in a memory list of desirable IDs to be monitored by said receiving radio;

receiving means for receiving transmissions containing an ID number of said transmitting radio and a modulated carrier signal from said transmitting radio;

means for comparing said ID number of said transmitting radio to said memory list to find a match to satisfy a first unsquelching condition;

means for detecting presence of said modulated carrier signal to satisfy a second unsquelching condition;

audio means for hearing transmissions if unmutted; and controller means for unmuting said audio means if said first and second unsquelching conditions are satisfied.

2. The conventional non-trunked communication system of claim 1 wherein said ID number comprises a no-unique ID number representing an assigned grouping of radios.

3. The receiving radio of claim 1 wherein said ID number comprises a group ID number representing an assigned grouping of radios.

4. In a two-way radio communication system a first radio to selectively monitor the a second radio in said first radio:

entering and identification representation corresponding to said second radio in a memory list of identification representations to be monitored by said first radio;

receiving a transmission containing said identification representation corresponding to said second radio from said second radio at said first radio;

comparing said identification representation received of said second radio to said identification representation corresponding to said second radio entered in said memory list to find a match in said first radio; and unmuting a squelching means if said match is found.

5. In a conventional non-trunked two-way radio communication system including an undesignated radio, the system comprising: said designated radio comprising:

means for transmitting a modulated carrier signal and an ID number to said undesignating radio; and said undesignated radio comprising:

means for entering selectively said ID number corresponding to said designated radio to be monitored;

memory means for storing said ID number in a memory list of deirable IDs to be monitored by said undesignated radio;

receiving means for receiving transmissions containing an ID number of said designated radio and said modulated carrier signal from said designated radio;

means for comparing said ID number of said designated radio to said memory list to find a match to satisfy a first unsquelching condition;

means for detecting presence of said modulated carrier signal to satisfy a second unsquelching condition;

audio means for hearing transmissions if unmuted; and controller means for unmuting said audio means if said first and second unsquelching conditions are satisfied.

6. In a two-way radio communication system including for selectively monitoring transmissions of a second radio, the first radio comprising:

means for entering an identification representation corresponding to said second radio to be monitored;

a memory list of identification representations to be monitored by said first radio;

memory means for storing said identification representation in said memory list;

receiving means for receiving transmissions containing said identification representation of said second radio and a modulated carrier signal from said second radio;

means for comparing said identification representation of said second radio to said memory list to find a match in said first radio;

audio means for hearing transmissions if unmuted; and controller means for unmuting said audio means if said match is found.

* * * * *

UNITED STATES PATENT AND TRADEMARK OFFICE
CERTIFICATE OF CORRECTION

PATENT NO. : 5,133,082

DATED : July 21, 1992

Page 1 of 2

INVENTOR(S) : Richard A.M. White

It is certified that error appears in the above-identified patent and that said Letters Patent is hereby corrected as shown below:

Column 5, line 22, delete "no-unique" and insert therefor
-- non-unique --.

Column 5, line 27, after radio communication, insert therefor
-- a method for --

Column 5, line 28, after the, insert therefore -- transmissions
of --

Column 5, line 28, after second radio, insert therefore -- comprising
the steps of: --

To clarify the corrections listed above for lines 27-28, column 5, the first paragraph of claim 4 should read:

In a two-way radio communication sytem, a method for a first radio to selectively monitor the transmissions of a second radio, comprising the steps of:
in said first radio:

Column 5, line 30, delete "and" and insert therefor -- an --

Column 5, line 45, after radio, insert therefor -- for selectively monitoring transmissions of a designated radio --

Column 6, line 2, delete"undesignating" and insert therefor
-- undesignated --

UNITED STATES PATENT AND TRADEMARK OFFICE
CERTIFICATE OF CORRECTION

PATENT NO. : 5,133,082

DATED : July 21, 1992

INVENTOR(S) : Richard A.M. White

It is certified that error appears in the above-indentified patent and that said Letters Patent is hereby corrected as shown below:

Column 6, line 26, after including, insert therefor -- a first radio--.

Signed and Sealed this

Twenty-eighth Day of September, 1993

Attest:

BRUCE LEHMAN

*Attesting Officer*  *Commissioner of Patents and Trademarks*